United States Patent
Crump et al.

(10) Patent No.: US 8,034,756 B2
(45) Date of Patent: Oct. 11, 2011

(54) FORMULATIONS WITH UNEXPECTED CLEANING PERFORMANCE INCORPORATING A BIODEGRADABLE CHELANT

(75) Inventors: Druce K. Crump, Lake Jackson, TX (US); David A. Wilson, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 366 days.

(21) Appl. No.: 12/297,386

(22) PCT Filed: Apr. 3, 2007

(86) PCT No.: PCT/US2007/008410
§ 371 (c)(1), (2), (4) Date: Oct. 16, 2008

(87) PCT Pub. No.: WO2007/127027
PCT Pub. Date: Nov. 8, 2007

(65) Prior Publication Data
US 2009/0099058 A1    Apr. 16, 2009

Related U.S. Application Data

(60) Provisional application No. 60/793,764, filed on Apr. 21, 2006.

(51) Int. Cl.
*C11D 7/26* (2006.01)
*C11D 7/32* (2006.01)
*C11D 7/10* (2006.01)

(52) U.S. Cl. ........ 510/247; 510/218; 510/219; 510/254; 510/255; 510/264; 510/434; 510/477; 510/488; 510/499

(58) Field of Classification Search .................. 510/218, 510/219, 247, 254, 255, 264, 434, 477, 488, 510/499
See application file for complete search history.

(56) References Cited

U.S. PATENT DOCUMENTS

| | | | |
|---|---|---|---|
| 3,965,048 A | 6/1976 | Murtaugh | |
| 4,486,275 A | 12/1984 | Emmenegger | |
| 5,376,310 A | 12/1994 | Cripe et al. | |
| 5,814,591 A | 9/1998 | Mills et al. | |
| 5,817,613 A * | 10/1998 | Athey et al. | 510/276 |
| 5,948,741 A | 9/1999 | Ochomogo et al. | |
| 5,948,742 A | 9/1999 | Chang et al. | |
| 5,972,868 A | 10/1999 | Athey et al. | |
| 5,972,876 A | 10/1999 | Robbins et al. | |
| 2006/0111267 A1 * | 5/2006 | Clifton et al. | 510/514 |

OTHER PUBLICATIONS

"Solids", Standard Methods for the Examination of Water and Wastewater, 1995, 19th Edition, Section 2540, American Public Health Association.

* cited by examiner

*Primary Examiner* — Gregory Delcotto

(57) ABSTRACT

A chelating composition suitable for low-temperature use or storage is disclosed. The chelating compositions include 20 to 70 wt. percent of a polar solvent and 30 to 80 wt. percent of a first component of the formula: (I) wherein R is a hydroxyalkyl group and each R' is individually selected from the group consisting of hydrogen, unsubstituted or inertly substituted alkyl groups, carbonyl-containing alkyl groups, carboxylate-containing alkyl groups, hydroxyalkyl groups and alkoxy groups; R" is selected from the group consisting of hydrogen, unsubstituted or inertly substituted alkyl groups; carbonyl-substituted alkyl groups, carboxylate-containing alkyl groups, hydroxyalkyl groups and alkoxy groups; $M_1$ and $M_2$ are alkali metal ions, wherein the $M_1$ has a higher atomic weight than $M_2$; wherein x+y=n and the mole fraction of M1 is greater than 0.70 to 1. Methods of suppressing crystallization and methods of cleaning surfaces employing the compositions described herein are also disclosed.

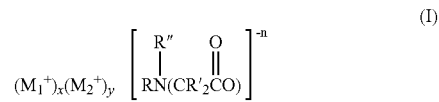

(I)

10 Claims, No Drawings

FORMULATIONS WITH UNEXPECTED CLEANING PERFORMANCE INCORPORATING A BIODEGRADABLE CHELANT

CROSS REFERENCE TO RELATED APPLICATIONS

This is a §371 application of PCT International Patent Application Number PCT/US2007/008410 filed Apr. 3, 2007, and claims priority from provisional application Ser. No. 60/793,764 filed Apr. 21, 2006, each of which is incorporated herein by reference in its entirety.

FIELD OF THE INVENTION

Embodiments of the invention are related to cleaning compositions and methods of cleaning surfaces with the cleaning compositions herein. Particular compositions are suitable for use and/or storage at low temperature without substantial crystallization or solidification.

BACKGROUND OF THE INVENTION

Chelants or chelating agents are compounds which form coordinate-covalent bonds with a metal ion to form chelates. Chelates are coordination compounds in which a central metal atom is bonded to two or more other atoms in at least one other molecule or ion, called a ligand, such that at least one heterocyclic ring is formed with the metal atom as part of each ring.

Chelating agents for metal ions, such as calcium, magnesium, iron, and manganese, are desired for a wide range of technical fields. Examples of fields of application and end-uses are detergents, in electroplating, in water treatment, photography, textile industry, paper industry and also various uses in pharmaceuticals, cosmetics, foodstuffs and plant nutrition. Some of these activities may result in the chelating agents entering the environment. For example, agricultural uses or use in detergents may result in measurable quantities of the chelants in water.

While some chelants are particularly useful for removing metal scaling, they can be susceptible to solidification or crystallization at low temperatures. For instance, iminodiacetic acid derivatives are known to possess metal sequestering properties. But concentrated solutions of the disodium salt of 2-hydroxyethyl iminodiacetic acid, a particularly useful derivative of iminodiacetic acid are observed to crystallize, in whole or in part, in cold weather conditions. Unfortunately, the solidification is unpredictable and the determining causes of solidification have been difficult to ascertain. Consequently, in operations where the chelant is used in cold climates this random and unpredictable behavior results in undesirably high amounts of chelant that is unusable at the time it is needed. Thus, it would be useful to provide chelant compositions that have suppressed solidification or crystallization at low temperatures.

SUMMARY OF THE INVENTION

Embodiments of the invention describe chelating compositions suitable for low-temperature use or storage. In other embodiments the invention describes methods of suppressing crystallization of a chelating solution by employing the compositions described herein. In still other embodiments, the invention provides a method of cleaning surfaces by providing cleaning compositions to the surface. The chelating compositions and method described herein employ a composition comprising:

a) 30 to 80 wt. percent of a first component of the formula:

wherein
R is a hydroxyalkyl group having from 1 to about 10 carbon atoms;
each R' is individually selected from the group consisting of hydrogen, unsubstituted or inertly substituted alkyl groups; carbonyl-containing alkyl groups, carboxylate-containing alkyl groups, hydroxyalkyl groups and alkoxy groups;
R" has from 1 to about 10 carbon atoms and is selected from the group consisting of unsubstituted or inertly substituted alkyl groups, carbonyl-substituted alkyl groups, carboxylate-containing alkyl groups, hydroxyalkyl groups and alkoxy groups; or hydrogen;
$M_1$ and $M_2$ are individually selected from the group consisting of Li+, Na+, K+, and Cs+, preferably K+ and Na+; wherein x+y=n; and the mole fraction of $M_1$ is greater than 0.70 and can be as large as 1, and wherein $M_1$ has a higher atomic weight than $M_2$. Some mixtures may contain certain amounts of structures where $M_1$ and $M_2$ are equivalent (e.g., some disodium or dipotassium species may be present); and b) 20 to 70 wt. percent of a polar solvent; wherein the weight percentages are based on the total amounts of the first component and the polar solvent.

In embodiments preferred for some applications, the mole fraction of $M_1$ is less than 1. Particular compositions include a first component where the mole fraction of $M_1$ is about 0.80, about 0.85, about 0.90, about 0.95, about 0.99, about 0.995, or less than 1.

Other embodiments of the invention are directed to methods of suppressing solidification of a chelating composition. The methods include providing a chelating composition that comprises 20 to 70 wt. percent of a polar solvent and 30 to 80 wt. percent of a first component as described herein.

Other embodiments of the invention are directed to methods of cleaning a surface. Typically the methods include providing a cleaning composition that generally constitutes at least about 0.01 wt. percent of the chelating composition described herein and typically less than about 50 wt. percent. Preferably the hard-surface cleaner contains about 0.1 to about 25 wt. percent of the chelating composition, and more preferably about 0.5 to about 15 wt. percent and removing the composition from the surface.

DESCRIPTION OF EMBODIMENTS OF THE INVENTION

In the following description, whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1% to 100% with a 1% increment, i.e., k is 1%, 2%, 3%, 4%, 5%, ..., 50%, 51%, 52%, ..., 95%, 96%, 97%, 98%, 99%, or 100%. Moreover, any numerical range defined by two R numbers as defined in the above is also specifically disclosed.

In one aspect, the invention provides a chelating composition suitable for low-temperature use or storage. The compositions preferably comprise a) 30 to 80 wt. percent of a first component of the formula:

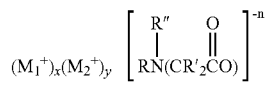

wherein R is a hydroxyalkyl group having from 1 to about 10 carbon atoms and each R' is individually selected from the group consisting of hydrogen, unsubstituted or inertly substituted alkyl groups; carbonyl-containing alkyl groups, carboxylate-containing alkyl groups, hydroxyalkyl groups and alkoxy groups; R" has from 1 to about 10 carbon atoms and is selected from the group consisting of unsubstituted or inertly substituted alkyl groups, carbonyl-substituted alkyl groups, carboxylate-containing alkyl groups, hydroxyalkyl groups and alkoxy groups; or hydrogen. $M_1$ and $M_2$ are individually selected from the groups consisting of Li+, Na+, K+, and Cs+, preferably Na+ and K+; x+y=n and the mole fraction of $M_1$ is greater than 0.70 to 1, and wherein $M_1$ has a higher atomic weight than $M_2$, more preferably $M_1$ is K+ and $M_2$ is Na+. The chelating compositions also include b) 20 to 70 wt. percent of a polar solvent. The weight percentages are based on the total amounts of the first component and the polar solvent.

In some embodiments, the compositions comprise about 40 to about 70 wt. percent, 45 to about 55 wt. percent, or about 50 to about 60, wt. percent of the first component. In particular embodiments, the first component follows the formula $(M_1^+)_x(M_2^+)_y(HOCH_2CH_2N(CH_2COO)_2)^{-2}$; wherein x+y=2, referred to hereafter as $(M_1^+)_x(M_2^+)_y(HEIDA)$. While any combination of $M_1^+$ and $M_2^+$ may be used, $M_1^+$ is $K^+$ and $M_2^+$ is $Na^+$ in preferred embodiments. In some embodiments the mole fraction of $M_1$ can be about 0.75 to about 0.80, about 0.85, about 0.90, about 0.95, about 0.99, or to 1. Likewise, in some embodiments, the lower limit on the mole fraction of $M_1$ can be about 0.80, about 0.85, about 0.90, about 0.95, about 0.99, about 0.995, or 1. In some embodiments, the upper limit of the range may be 0.80, 0.85, 0.90, to 0.95. In particular embodiments the mole fraction of $M_1$ ranges from 0.75 to about 0.99, or about 0.80 to 1. In other embodiments, the mole fraction of $M_1$ as represented by x ranges from 0.85 to about 0.99, or about 0.80 to about 0.90.

Compositions having two different alkali metal ions may be prepared by separately forming and isolating the different metal salts. For example, $Na_2(HEIDA)$ and $K_2(HEIDA)$ may be separately prepared by hydrolysis with sodium hydroxide and potassium hydroxide, respectively, and then combined in the desired ratio. Or a mixture of alkali metal hydroxides may be used to conduct the hydrolysis in order to provide the desired ratio of alkali metals. For example, in some embodiments, the hydrolysis can be performed with the desired ratio of sodium hydroxide and potassium hydroxide thereby forming the K/Na(HEIDA) in a single step to provide a dimetallic salt of the formula $(K)_x(Na)_y(HEIDA)$. Whatever alkali addition scheme is used, the final molar ratio of $M_1$ is greater than 0.70 in the formula $(M_1^+)_x(M_2^+)_y(HOCH_2CH_2N(CH_2COO)_2)^{-2}$, and typically the hydrolysis is performed in the presence of an excess molar amount of base at a temperature from about 20 to about 105° C.

In other embodiments, the nitrile functionality can be hydrolyzed using strong acids such as hydrochloric or sulfuric acid. In this case, the ammonium salt of the respective acid is obtained as a by-product.

One method for preparing the compositions described herein entails the addition of a cyanide source and a reactive aldehyde to a hydroxyalkylamine in the presence of appropriate sources of the desired alkali metals. The reactive aldehyde and the hydroxyalkylamine are selected to provide the desired R', R" and R groups of the first component. In a preferred method, HCN and formaldehyde are added to 2-hydroxyethylamine and alkali metal hydroxide solutions wherein the resulting mole fraction of $M_1$ ranges from greater than 0.7 to 1 in the formula $(M_1)_x(M_2)_y(HEIDA)$. Alternatively, glycolonitrile may be used in place of the HCN and formaldehyde. In addition, the compositions may be formed by adding the desired alkali metal cyanides and formaldehyde to the hydroxyalkylamine. For example, production of compositions comprising $(M_1^+)_x(M_2^+)_y(HOCH_2CH_2N(CH_2COO)_2)^{-2}$ can be accomplished by adding the desired proportions of alkali metal cyanides and formaldehyde to 2-hydroxyethylamine. The respective alkali metal hydroxides or alkali metal cyanides may be added independently, as mixtures, or concurrently with other components in the hydrolysis reaction as long as the final molar fraction of $M_1$ ranges from greater than 0.7 to 1 in the formula $(M_1^+)_x(M_2^+)_y(HOCH_2CH_2N(CH_2COO)_2)^{-2}$. The reactants are combined under any suitable reaction conditions. Preferably the reactants are combined at a temperature and pressure to achieve alkaline hydrolysis, thereby rapidly converting the 2-hydroxyethylamine to the alkali metal HEIDA composition. Temperatures ranging from about 20° C. to the reflux temperature of the solvent are preferred. A temperature of at least 60° C. typically provides a suitable reaction rate. Also higher temperatures may drive the reaction by forcing the ammonia by-product out of the reaction mixture. Ammonia removal may also be facilitated using reduced pressure. When using methods comprising the hydrolysis step, a mixture containing $(M_1)_x(M_2)_y(HOCH_2CH_2N(R)(CH_2COO))^{-n}$ is usually formed wherein R is predominantly (—$CH_2COO$) with a portion of R also being hydrogen. In process schemes where the dinitrile precursor of HEIDA is formed, isolated and purified prior to alkaline hydrolysis, the hydrolyzed product composition will consist essentially of $(M_1)_x(M_2)_y(HEIDA)$.

Alternatively, the alkali metal HEIDA may be prepared from the acid form of HEIDA and the appropriate alkali metal hydroxides.

Compositions described herein also include a polar solvent. As mentioned above the solvent can be present in an amount ranging from about 20 to 70 wt. percent, based on the amounts of the solvent and the first component. Some embodiments include 30 to about 60 wt. percent, 35 to about 55 wt. percent, or about 40 to about 50 wt. percent of the polar solvent. Some preferred polar solvents have a boiling point of greater than 90° C. Some suitable solvents include water, water-soluble or water-dispersible organic solvents including alcohols having 2 to about 16 carbon atoms, diols, glycol ethers, and mixtures thereof. In chelating compositions, the preferred solvent is water.

The chelating composition can be made by providing the first component and the polar solvent by any suitable means. For example, in some embodiments, the first component may be provided as a solid and combined with the polar solvent. In other embodiments, the first component may be present at one concentration in a polar solvent and then diluted with additional polar solvent or concentrated by removing the solvent at an elevated temperature, or under reduced pressure, or both at an elevated temperature and reduced pressure. In some embodiments, the first component may be formed in an appropriate amount of the polar solvent before being subjected to one or more purification steps to obtain the desired composition without separate additional steps of providing the polar solvent.

In particular embodiments, such chelating compositions are characterized by their resistance to solidification at low temperatures, such that less than about 5 wt. percent of the composition forms solids after being maintained at $-12°$ C. for 12 hours. Preferably, less than about 0.1 wt. percent form solids after being maintained at $-12°$ C. for a period ranging from about 12 hours to 30 days. Other compositions have less than 1 wt. percent solids, less than 0.1 wt. percent solids, less than 0.01 wt. percent solids or are substantially free of solids after up to 60 days, up to 90 days, up to 120 days or up to 180 days or more when maintained at $-12°$ C. Preferably, the chelating compositions are substantially free of solids. Insoluble solids may be determined by visual inspection or may be quantified by filtration and gravimetric measurement at low temperature (to prevent melting of the solids). The method used to quantify the amount of solids formed may be an appropriate modification of a standard method for determining solids present in a liquid. One particular method is "Standard Methods for the Examination of Water and Wastewater," prepared and published by the American Public Health Association, American Water Works Association, and Water Environment Federation; $19^{th}$ Edition 1995; Managing Editor Mary Ann H. Franson; Section 2540 "Solids", where the necessary steps should be taken to prevent errors due to thawing, melting, or dissolution of solids. Typically, the presence of solids is indicated by a cloudy or hazy appearance upon visual inspection. Thus, compositions that are substantially free of solids lack a hazy or cloudy appearance after storage at $-12°$ C. for at least 12 hours.

In another aspect, cleaning compositions are described comprising a chelating agent derived from a first component as described above. In such embodiments, $M_1$ preferably has a greater atomic weight than $M_2$, but in some embodiments, no $M_2$ is present, thereby effectively providing a dipotassium first component, particularly of the formula $K_2(HEIDA)$. In some embodiments, $(M_1)_x(M_2)_y(HEIDA)$ wherein $M_1$ is potassium and $M_2$ is sodium may be more effectively used if compatibility issues arise with $K_2(HEIDA)$. Compositions wherein the first component comprises $(M_1)_x(M_2)_y(HEIDA)$ are particularly advantageous for use in hard-surface cleaning applications, such as certain automatic dishwashing agents and kitchen or bathroom soil removal, especially calcium soap removal from bathtub surfaces. Some $(M_1)_x(M_2)_y(HEIDA)$ compositions are advantageous for use in hard-surface cleaners used for controlling alkaline-earth metals, particularly calcium, and in preventing scaling. When used in hard-surface cleaners, the $(M_1)_x(M_2)_y(HEIDA)$ generally constitutes at least about 0.01 wt. percent of the cleaner and typically less than about 50 wt. percent. Preferably the hard-surface cleaner contains about 0.1 to about 25 wt. percent $(M_1)_x(M_2)_y(HEIDA)$, and more preferably about 0.5 to about 15 wt. percent $(M_1)_x(M_2)_y(HEIDA)$.

Such cleaning compositions can also include an anionic, nonionic, cationic, or amphoteric surfactant, and mixtures thereof; optionally including a quaternary ammonium surfactant, the total amount of said surfactant being present in an effective amount.

For example, surfactants may be present in hard-surface cleaning compositions and in some embodiments may comprise from about 0.05 to about 15 wt. percent of the formulation. Preferably, a surfactant is present in a concentration that corresponds to from about 2 to about 6 percent surfactant. Concentrated liquid compositions preferably contain from about 6 to about 10 percent surfactant.

Such surface active agents include water-soluble surfactants such as synthetic anionic, nonionic, cationic, amphoteric and zwitterionic surfactants and mixtures thereof. Exemplary surfactants include the alkyl benzene sulfates and sulfonates, paraffin sulfonates, olefin sulfonates, alkoxylated (especially ethoxylated) alcohols and alkyl phenols, amine oxides, sulfonates of fatty acids and of fatty acid esters, and the like, which are known in the detergency art. Preferably, such surfactants contain an alkyl group in about the $C_{10}$-$C_{18}$ range. Anionic surfactants are commonly used in the form of their sodium, potassium or triethanolammonium salts. The nonionics advantageously contain from about 3 to about 17 ethylene oxide groups per mole of hydrophobic moiety. Representative cationic surfactants include quaternary ammonium compounds such as ditallow dimethyl ammonium chloride, and are preferably used in combination with nonionic surfactants. Preferred in the composition are about $C_{12}$-$C_{16}$ alkyl benzene sulfonates, about $C_{12}$-$C_{18}$ paraffin-sulfonates and the ethoxylated alcohols of the formula $RO(CH_2CH_2O)n$, with R being a $C_{12}$-$C_{15}$ alkyl chain and n being a number from 6 to 10, and the ethoxylated alcohol sulfates of formula $RO(CH_2CH_2O)_nSO_3M$, with R being a $C_{12}$-$C_{18}$ alkyl chain, n is a number from about 2 to about 8, and M is H or an alkali metal ion.

Anionic surfactants are advantageously present at levels from about 0.3 percent to about 8 percent of the hard surface cleaning composition. Nonionic surfactants are preferably used at levels between about 0.1 percent to about 6 percent by weight of the composition. Mixtures of surfactants are also useful.

Typically, at least one water-soluble or dispersible organic solvent is also included in the cleaning compositions. Suitable solvents have a vapor pressure of at least 0.001 mm Hg at $25°$ C., said at least one organic solvent present in a solubilizing—or dispersion—effective amount. The solvent is a water soluble or dispersible organic solvent having a vapor pressure of at least 0.001 mm Hg at $25°$ C. It is preferably selected from $C_{1-6}$ alcohols, $C_{1-6}$ diols, alkylene glycol ethers having up to 24 carbon atoms, and mixtures thereof. Particularly useful alcohols include methanol, ethanol, n-propanol, isopropanol, butanol, pentanol, hexanol, their various positional isomers, and mixtures of the foregoing. Particularly suitable diols may include methylene, ethylene, propylene and butylene glycols, and mixtures thereof.

In some embodiments of the cleaning compositions, an alkylene glycol ether solvent may be preferred. The alkylene glycol ether solvents can include ethylene glycol monobutyl ether, ethylene glycol monopropyl ether, propylene glycol n-propyl ether, propylene glycol monobutyl ether, diethylene glycol n-butyl ether, dipropylene glycol methyl ether, dipropylene glycol N-butyl ether and mixtures thereof. Preferred glycol ethers are ethylene glycol monobutyl ether, also known as butoxyethanol, and 2-(2-butoxyethoxy) ethanol, and propylene glycol n-propyl ether, and dipropylene glycol N-butyl ether (DPNB), available from a variety of sources. Another preferred alkylene glycol ether is propylene glycol t-butyl ether, which is commercially sold as Arcosolv PTB™, by Arco Chemical Company. The n-butyl ether of propylene glycol is also preferred. Certain terpene and terpene derivatives, such as, without limitation, d-Limonene, are also suitable for use. If mixtures of solvents are used, the amounts and ratios of such solvents used are important to determine the optimum cleaning performances of the inventive cleaner. It is preferred to limit the total amount of solvent to no more than 50%, more preferably no more than 25%, and most preferably, no more than 15%, of the cleaner. A preferred range is about 1-15%. These amounts of solvents are generally referred to as dispersion-effective or solubilizing effective amounts, since the other components, such as surfactants, are materials which are assisted into solution by the solvents. The solvents are also important as cleaning materials on their own, helping to loosen and solubilize greasy soils for easy removal from the surface cleaned.

Hard-surface cleaning compositions, particularly those containing $(M_1)_x(M_2)_y(HEIDA)$, may be useful in a wide pH range of about 2 to 14. Preferably the pH of the cleaning composition is from about 3 to about 13, and more preferably from about 4 to about 12.

Other optional ingredients include detergent builders, within the skill in the art, including nitrilotriacetate (NTA), polycarboxylates, citrates, water-soluble phosphates such as tri-polyphosphate and sodium ortho- and pyro-phosphates, silicates, ethylene diamine tetraacetate (EDTA), amino-polyphosphonates, phosphates and mixtures thereof.

Other optional additives for the hard surface cleaners include detergent hydrotropes. Exemplary hydrotropes include urea, monoethanolamine, diethanolamine, triethanolamine and the sodium, potassium, ammonium and alkanol ammonium salts of xylene-, toluene-, ethylbenzene- and isopropyl-benzene sulfonates.

The hard-surface cleaning compositions of the invention also optionally contain an abrasive material. The abrasive materials include water-insoluble, non-gritty materials known for their relatively mild abrasive properties. Abrasive materials having a Mohs hardness of no more than about 7 are preferred; while abrasives having a Mohs hardness of no more than about 3, are useful to avoid scratches on finishes such as aluminum or stainless steel. Suitable abrasives include inorganic materials, especially such materials as calcium carbonate and diatomaceous earth, as well as materials such as Fuller's earth, magnesium carbonate, China clay, actapulgite, calcium hydroxyapatite, calcium orthophosphate, dolomite and the like. The aforesaid inorganic materials can be described as "strong abrasives". Organic abrasives such as urea-formaldehyde, methyl methacrylate melamine-formaldehyde resins, polyethylene spheres and polyvinylchloride are advantageously used to avoid scratching on certain more delicate surfaces, such as plastic surfaces. Preferred abrasives have a particle size range of about 10-1000 microns and are preferably used at concentrations of about 5 percent to about 30 wt. percent of the hard surface cleaning compositions.

Thickeners are preferably used to suspend the abrasives. Levels of thickener difficult to rinse from the cleaned surfaces are undesirable. Accordingly, the level is preferably less than about 2 percent, preferably from about 0.25 to about 1.5 percent. Exemplary thickeners include polyacrylates, xanthan gums, carboxymethyl celluloses, swellable smectite clay, and the like.

In some embodiments, the cleaning compositions also include water. Other optional components of the formulation may include buffers, builders, hydrotropes, grease-cutting agents such as d-limonene, thickeners, antifoaming agents, anti-spotting agents, corrosion inhibitors, anti-oxidants, and others. Soaps, especially soaps prepared from coconut oil fatty acids are also optionally included in the hard surface cleaners. Such other components, including water, may comprise from about from 0.05 to 25 wt. percent of the composition.

Additional optional components include components within the skill in the art to provide aesthetic or additional product performance benefits. Such components include perfumes, dyes, optical brighteners, soil suspending agents, detersive enzymes, gel-control agents, thickeners, freeze-thaw stabilizers, bactericides, preservatives, and the like.

Some compositions herein are in the form of creamy scouring cleansers, preferably containing an abrasive material, surface-active agent, and the (HEIDA) chelating compositions, particularly compositions including $(K)_x(Na)_y(HEIDA)$, where the mole fraction of M1 ranges from greater than about 0.70 to 1, preferably from about 0.75 to 1, or about 0.80 to 1. In other embodiments, the mole fraction of $M_1$ ranges from 0.85 to about 0.99, or about 0.80 to about 0.90.

The cleaning compositions can be packaged in a container that comprises a means for creating a spray, e.g., a pump, aerosol propellant or spray valve. The composition can be thus conveniently applied to the surface to be cleaned by conventional means, such as wiping with a paper towel or cloth, without the need for rinsing.

In some embodiments of the cleaning compositions, the biodegradable chelant $(M_1)_x(M_2)_y(HEIDA)$ can be used in hard-surface cleaners free of organic solvents. This is particularly advantageous in that cleaning can be done without the concern for release of organic solvent into the environment.

Salts having the formula $(M_1)_x(M_2)_y(HEIDA)$ may also be used in pipes, vessels, heat exchangers, evaporators, and filters for control of alkaline-earth and transition metals, particularly calcium and iron, and in preventing scaling. HEIDA and its soluble salts demonstrate advantages over EDTA due to their enhanced biodegradability and greater solubility across the pH range. $(M_1)_x(M_2)_y(HEIDA)$ can be employed in these applications in an amount effective to control alkaline earth and transition metals and prevent scaling in pipes, vessels, heat exchangers, evaporators, and filters. An effective amount of the $(M_1)_x(M_2)_y(HEIDA)$ employed in these applications may be readily determined by a person skilled in the art. The effective amount is dictated by the amount of troublesome metals that need to be controlled. For example, typically, in boiler feed water, HEIDA is used in an amount of from about 1 to about 1000 ppm, preferably from about 1 to about 100 ppm, more preferably from about 1 to about 20 ppm. In water systems with higher levels of hardness and other metal ions, effective amounts of HEIDA are near or at stoichiometric amounts of metal ion to HEIDA. Thus, when water soluble salts of the formula $(M_1)_x(M_2)_y(HEIDA)$ are used, they are used in an amount which will provide the aforementioned amounts of HEIDA.

The compositions described herein may be used in a method of cleaning a surface, wherein the method comprises contacting the surface with a cleaning composition as described herein and removing the composition from the surface. In some embodiments the $(M_1)_x(M_2)_y(HEIDA)$ compositions are also useful for cleaning or removing mineral scale deposits that have accumulated in pipes, vessels, heat exchangers, evaporators, and filters. An effective amount of HEIDA employed in these applications can be readily determined by a person skilled in the art. Typically, HEIDA is used in an amount of from about 0.1 to about 50, preferably from about 1 to about 30, more preferably from about 2 to about 20 percent by weight based on the weight of the aqueous solution of HEIDA or a salt thereof. For removing scale deposits, the pH of the HEIDA solutions and HEIDA salt solutions comprising $(M_1)_x(M_2)_y(HEIDA)$ used may be chosen based on the most advantageous pH for scale removal and for minimizing corrosion of the substrate being cleaned. $(M_1)_x(M_2)_y(HEIDA)$ may be preferred in these applications due to its enhanced biodegradability and greater solubility at effective concentrations over the pH range of about 2 to 13. Typically, the temperature of the scale removal process is between 10 and 150° C., preferably from about 20 to 120° C., and more preferably from about 30 to 100° C. Again, $(M_1)_x(M_2)_y$(HEIDA)-containing compositions, should be used in an amount which will provide the aforementioned amounts of HEIDA.

Some embodiments of the compositions described herein are also advantageous for use in the oil field applications such as, for example, for drilling, production, recovery, and hydrogen sulfide abatement. Some compositions demonstrate advantages in these applications over EDTA due to their enhanced biodegradability and greater solubility across the pH range. In particular, some of the compositions are useful for control of alkaline-earth metals, particularly calcium, and in preventing scaling in oil drilling, production and recovery applications. Compositions can also be employed in the oil field applications in an effective amount to control or prevent scaling. An effective amount of $(M_1)_x(M_2)_y$(HEIDA) in the compositions for use in oil field applications can be determined by a person skilled in the art. Typically, HEIDA is used in an amount of from about 0.1 to about 50, preferably from about 1 to about 40, more preferably from about 2 to about 20 percent by weight based on the weight of the aqueous solution. The water soluble salt of the formula $(M_1)_x(M_2)_y$(HEIDA) should be used in an amount which will provide the aforementioned amounts of HEIDA.

Production fluid from oil wells contains a mixture of oil and water. The water usually contains soluble cations, such as, calcium, magnesium and iron in addition to soluble carbonate, bicarbonates, sulfates and other anions. As this mixture is produced, the pressure of the well can change causing a shift in equilibrium of the soluble species. For example, calcium can react with carbonate to form calcium carbonate which can deposit on the well perforation and well casing which can limit well production.

Production can be restored by mechanical and chemical removal of the scale deposit. Chemical treatment is often the most effective method for removing calcium carbonate and calcium sulfate deposits from the well perforation. Compositions including $(M_1)_x(M_2)_y$(HEIDA) compositions used for removing calcium deposits from the well perforation have acceptable dissolution performance that in at least some embodiments is equivalent to or better than EDTA. Some compositions comprising $(M_1)_x(M_2)_y$(HEIDA) have the added advantage of greater solubility across the pH range than EDTA and its respective salts, particularly at pH values of less than about 5.

In other embodiments, compositions comprising $(M_1)_x(M_2)_y$(HEIDA) are useful, for instance, in food products vulnerable to metal-catalyzed spoilage or discoloration; in cleaning and laundering products for removing metal ions, e.g. from hard water that may reduce the effectiveness, appearance, stability, rinsibility, bleaching effectiveness, germicidal effectiveness or other property of the cleaning agents; in personal care products like creams, lotions, deodorants and ointments to avoid metal-catalyzed oxidation and rancidity, turbidity, reduced shelf-life and the like; and in pulp and paper processing to enhance or maintain bleaching effectiveness. Compositions comprising $(M_1)_x(M_2)_y$(HEIDA) can also be used in pipes, vessels, heat exchanges, evaporators, filters and the like to avoid or remove scaling; in pharmaceuticals; in metal working; in textile preparation, desizing, scouring, bleaching, dyeing and the like; in agriculture as in chelated micronutrients or herbicides; in polymerization or stabilization of polymers; in photography, e.g. in developers or bleaches; and in the oil field such as for drilling, production, recovery, hydrogen sulfide abatement and the like. The amount of chelating agent employed in the above noted applications may be readily determined by one skilled in the art.

EXAMPLES

Comparative Examples 1-3

A mixture containing 25 wt. percent $Na_2$HEIDA is prepared by diluting $Na_2$HEIDA with an appropriate amount of water. A laboratory rig is assembled including a stainless steel centrifugal pump, stainless lines and fittings, and a 10-micron filter media using fittings and valves to simulate plant equipment and procedures. Portions of the composition are handled at about 10° C., 0° C. and −10° C., respectively and then tested for crystallization or freezing by being placed in a −12° C. freezer for 12 hours. Examination of each of the compositions after being maintained in the freezer show significant solids formation.

Comparative Examples 4-6

A mixture containing 40 wt. percent $Na_2$HEIDA is prepared by diluting $Na_2$HEIDA with an appropriate amount of water. A laboratory rig is assembled including a stainless steel centrifugal pump, stainless lines and fittings, and a 10-micron filter media using fittings and valves to simulate plant equipment and procedures. Portions of the composition are handled at about 10° C., 0° C., and −10° C. and then tested for crystallization or freezing by being placed in a −12° C. freezer for 12 hours. Examination of the composition after being maintained in the freezer show significant solids formation.

Comparative Examples 7-9

A mixture containing 55 wt. percent $Na_2$HEIDA is prepared by diluting $Na_2$HEIDA with an appropriate amount of water. A laboratory rig is assembled including a stainless steel centrifugal pump, stainless lines and fittings, and a 10-micron filter media using fittings and valves to simulate plant equipment and procedures. Portions of the composition are handled at about 10° C., 0° C., and −10° C. When handled at 0° C. and −10° C., the solutions can not be pumped. The 10° C. solution can be pumped in the laboratory rig. The 10° C., 0° C., and −10° C. solutions are then tested for solids formation by being placed in a −12° C. freezer for 12 hours. Examination of the compositions after being maintained in the freezer show significant solids formation.

Comparative Example 10

A composition comprising 25 wt. percent HEIDA species having a formula of $(K)_{1.2}(Na)_{0.8}$(HEIDA) is prepared by combining 15.54 wt. percent $K_2$HEIDA and 9.46 wt. percent $Na_2$HEIDA with water. The composition is handled at −10° C. in substantially the same manner as described in the Comparative Examples 7-9. After storage for 12 hours at −12° C. the composition shows significant solids formation.

Comparative Example 11

A composition comprising 25 wt. percent HEIDA species having a formula of $(K)_{1.4}(Na)_{0.6}$(HEIDA) is prepared by combining 17.97 wt. percent $K_2$HEIDA and 7.03 wt. percent $Na_2$HEIDA with water. The composition is handled at −10° C. in substantially the same manner as described above in Comparative Examples 7-9. After storage for 12 hours at −12° C. the composition shows significant solids formation.

Comparative Example 12

A composition comprising 25 wt. percent HEIDA species having a formula of $(K)_{1.6}(Na)_{0.4}(HEIDA)$ is prepared by combining 20.35 wt. percent $K_2HEIDA$ and 4.65 wt. percent $Na_2HEIDA$ with water. The composition is handled at −10° C. in substantially the same manner as described above in Comparative Examples 7-9. After storage for 12 hours at −12° C. the composition shows significant solids formation.

Comparative Example 13

A composition comprising 25 wt. percent HEIDA species having a formula of $(K)_{1.8}(Na)_{0.2}(HEIDA)$ is prepared by combining 22.70 wt. percent $K_2HEIDA$ and 2.30 wt. percent $Na_2HEIDA$ with water. The composition is handled at −10° C. in substantially the same manner as described above in Comparative Examples 7-9. After storage for 12 hours at −12° C. the composition shows significant solids formation.

Comparative Example 14

A composition comprising 25 wt. percent of $K_2HEIDA$ is prepared by combining 25.0 wt. percent $K_2HEIDA$ with water. The composition is handled at −10° C. in substantially the same manner as described above in Comparative Examples 7-9. After storage for 12 hours at −12° C. the composition shows significant solids formation.

Comparative Example 15

A composition comprising 40 wt. percent HEIDA species having a formula of $(K)_{1.2}(Na)_{0.8}(HEIDA)$ is prepared by combining 24.86 wt. percent $K_2HEIDA$ and 15.14 wt. percent $Na_2HEIDA$ with water. The composition is handled at −10° C. in substantially the same manner as described above in Comparative Examples 7-9. After storage for 12 hours at −12° C. the composition shows solids formation.

Comparative Example 16

A composition comprising 40 wt. percent HEIDA species having a formula of $(K)_{1.4}(Na)_{0.6}(HEIDA)$ is prepared by combining 28.75 wt. percent $K_2HEIDA$ and 11.25 wt. percent $Na_2HEIDA$ with water. The composition is handled at −10° C. in substantially the same manner as described above in Comparative Examples 7-9. After storage for 12 hours at −12° C. the composition shows solids formation.

Example 17

A composition comprising 40 wt. percent HEIDA species having a formula of $(K)_{1.6}(Na)_{0.4}(HEIDA)$ is prepared by combining 32.57 wt. percent $K_2HEIDA$ and 7.43 wt. percent $Na_2HEIDA$ with water. The composition is handled at −10° C. in substantially the same manner as described above in Comparative Examples 7-9. After storage for 12 hours at −12° C. the composition did not show solids formation.

Example 18

A composition comprising 40 wt. percent HEIDA species having a formula of $(K)_{1.8}(Na)_{0.2}(HEIDA)$ is prepared by combining 36.32 wt. percent $K_2HEIDA$ and 3.68 wt. percent $Na_2HEIDA$ with water. The composition is handled at −10° C. in substantially the same manner as described above in Comparative Examples 7-9. After storage for 12 hours at −12° C. the composition did not show solids formation.

Example 19

A composition comprising 40 wt. percent of $K_2HEIDA$ is prepared by combining 40.0 wt. percent $K_2HEIDA$ with water. The composition is handled at −10° C. in substantially the same manner described above in Comparative Examples 7-9. After storage for 12 hours at −12° C. the composition did not show solids formation.

Comparative Example 20

A composition comprising 55 wt. percent HEIDA species having a formula of $(K)_{1.2}(Na)_{0.8}(HEIDA)$ is prepared by combining 34.19 wt. percent $K_2HEIDA$ and 20.81 wt. percent $Na_2HEIDA$ with water. The composition is handled at −10° C. in substantially the same manner described above in Comparative Examples 7-9. After storage for 12 hours at −12° C. the composition shows solids formation.

Comparative Example 21

A composition comprising 55 wt. percent HEIDA species having a formula of $(K)_{1.4}(Na)_{0.6}(HEIDA)$ is prepared by combining 39.53 wt. percent $K_2HEIDA$ and 15.47 wt. percent $Na_2HEIDA$ with water. The composition is handled at −10° C. in substantially the same manner described above in Comparative Examples 7-9. After storage for 12 hours at −12° C. the composition shows solids formation.

Comparative Example 22

A composition comprising 55 wt. percent HEIDA species having a formula of $(K)_{1.6}(Na)_{0.4}(HEIDA)$ is prepared by combining 44.78 wt. percent $K_2HEIDA$ and 10.22 wt. percent $Na_2HEIDA$ with water. The composition is handled at −10° C. in substantially the same manner as described above in Comparative Examples 7-9. After storage for 12 hours at −12° C. the composition shows solids formation.

Example 23

A composition comprising 55 wt. percent HEIDA species having a formula of $(K)_{1.8}(Na)_{0.2}(HEIDA)$ is prepared by combining 49.93 wt. percent $K_2HEIDA$ and 5.07 wt. percent $Na_2HEIDA$ with water. The composition is handled at −10° C. in substantially the same manner as described above in Comparative Examples 7-9. After storage for 12 hours at −12° C. the composition did not show solids formation.

Example 24

A composition comprising 55 wt. percent of $K_2HEIDA$ is prepared by combining 55.0 wt. percent $K_2HEIDA$ with water. The composition is handled at −10° C. in substantially the same manner as described above in Comparative Examples 7-9. After storage for 12 hours at −12° C. the composition did not show solids formation.

Example 25

A composition comprising about 39-40% HEIDA species wherein the resulting mole fraction of $M_1$ equals 0.8 in the formula $(M_1)_x(M_2)_y(HOCH_2CH_2N(R)(CH_2COO))^{-n}$ wherein R is predominately —$CH_2COO$ with a minor portion of R also being hydrogen is prepared as follows: 61.09 grams of hydroxethylamine and 201.97 grams of 45% KOH, 32.88 grams of 50% NaOH, and about 250 grams of deionized water are combined in a stainless steel reactor. While stirring and heating at a temperature of approximately 100° C., an aqueous glycolonitrile solution (about 285 grams 40% active) is slowly added. Air is sparged into the reaction solution to aid elimination of the by-product ammonia. Water is added in increments as needed to maintain the proper liquid volume. After completion of the reaction, the solution is cooled and deionized water is added to achieve the final concentration of about 39 wt. percent $(K)_{1.6}(Na)_{0.4}(HEIDA)$ and about 1 wt. percent $(K)_{0.8}(Na)_{0.2}(HOCH_2CH_2N(H)(CH_2COO)$. Products incorporating the range of molar ratios wherein the mole fraction of $M_1$ is greater than 0.7 are prepared in a similar manner as above by applying the appropriate amount of the alkali metal source. The alkali metal components may be added separately or as mixtures, added incrementally or in a continuous fashion as long as the final molar fraction of $M_1$ is greater than 0.7 in the formula $(M_1)_x(M_2)_y(HOCH_2CH_2N(R)(CH_2COO))^{-n}$ wherein R is (—$CH_2COO$) or hydrogen with R being predominately (—$CH_2COO$), or R is essentially all (—$CH_2COO$).

Compositions having 25 wt. percent $Na_2HEIDA$ but substantially lacking $K_2HEIDA$ form solids at −12° C. after 12 hours. Compositions having both $Na_2HEIDA$ and $K_2HEIDA$ and 25 wt. percent HEIDA species also form solids. Compositions having both $Na_2HEIDA$ and $K_2HEIDA$ and 40 wt. percent HEIDA species show acceptable behavior where less than 12 wt. percent, preferably less than 10 wt. percent, or less than 8 wt. percent of $Na_2HEIDA$ is present. Acceptable behavior is shown for compositions having both $Na_2HEIDA$ and $K_2HEIDA$ and 55 wt. percent HEIDA species, when less than 10 wt. percent, preferably less than 9 wt. percent, less than 8 wt. percent, or less than 6 wt. percent $Na_2HEIDA$ is present.

Some of the compositions having 40 wt. percent and 55 wt. percent $K_2HEIDA$ provide acceptable cold weather handling and storage performance while compositions having 25 wt. percent $K_2HEIDA$ have solids present at −12° C. after about 12 hours.

Cleaning formulations are prepared to contain the following (by weight): 2.62% Sodium dodecylbenzene sulfonic acid, 2.62% cocoamidopropyl betaine (Lonzaine C), 2.62% ethylene glycol butyl ether (Dowanol EB™), 3.2% of the chelant salt (except for the blank, which contains all components except the chelant), and the balance water. Thus the formulation of Example 31 contains 3.2% by weight of the chelant salt (in this case, $K_2HEIDA$), and so on for Examples 32 and 33 which evaluate $(K)_{1.8}(Na)_{0.2}(HEIDA)$, and $(K)_{1.6}(Na)_{0.4}(HEIDA)$, respectively, as well as Comparative Examples 27-30 which evaluate the formulations containing $Na_4EDTA$, $Na_2HEIDA$, $K_4EDTA$, and $(K)_{1.0}(Na)_{1.0}(HEIDA)$, respectively.

The cleaning ability of these compositions is determined according to ASTM D5343, "Standard Guide for Evaluating Cleaning Performance of Ceramic Tile Cleaners:" using soiled white bathroom tiles as directed by the procedure. The principal metal-containing components of the soil mixture are calcium, magnesium, and ferric iron, present as their highly insoluble stearate salts (soap scum). The soiled tiles are placed in the scrubbing apparatus. 10 ml of the cleaning formulation is placed on the face of a pre-moistened sponge, then the number of strokes (under 454 grams of force) are determined to achieve soil removal of 90% or greater. The number of strokes required by each formulation to obtain 90% or greater soil removal is recorded for each cleaning formulation. Results are in the Table 1 below:

TABLE 1

| Example | Chelant in formulation | Number of Strokes |
|---|---|---|
| Comparative 26 | none | >80 |
| Comparative Example 27 | $Na_4EDTA$ | >80 |
| Comparative Example 28 | $Na_2HEIDA$ | >80 |
| Comparative Example 29 | $K_4EDTA$ | 19 (+/−2) |
| Comparative Example 30 | $(K)_{1.0}(Na)_{1.0}(HEIDA)$ | 80 (+/−2) |
| Example 31 | $(K)_{2.0}(Na)_{0.0}HEIDA$ | 19 (+/−2) |
| Example 32 | $(K)_{1.8}(Na)_{0.2}(HEIDA)$ | 19 (+/−2) |
| Example 33 | $(K)_{1.6}(Na)_{0.4}(HEIDA)$ | 18 (+/−2) |

These results indicate that cleaning with the claimed $(K)_x(Na)_y(HEIDA)$ compositions where the mole fraction of $M_1$ is greater than 0.70, is substantially the same as cleaning with the $K_4EDTA$ formula and better than cleaning compositions containing the $Na_4EDTA$ formula, even though the $(K)_x(Na)_y(HEIDA)$ is a much weaker chelant for $Ca^{2+}$, $Mg^{2+}$, and $Fe^{3+}$ ion than either $K_4EDTA$ or $Na_4EDTA$. The results also indicate that cleaning with the claimed $(K)_x(Na)_y(HEIDA)$ formulations is better than cleaning with the $Na_2HEIDA$ formulation.

To compare the strength of various chelating agents, their metal binding constants are determined in the laboratory by techniques such as described in *Determination and Use of Stability Constants* by A. E. Martell and R. J. Motekaitis. Table 2 below lists the stability constants of HEIDA and EDTA with calcium, magnesium, and ferric iron. The values are logarithmic, thus each unit represents an order of magnitude. Therefore, a difference of one Log K unit represents a factor of 10 in binding strength, while two units represent a factor of 100, etc. Values reported below are the overall constants as compiled in the "NIST Critical Stability Constants of Metal Complexes Database," expressed as the log of the concentration of the metal complex divided by the product of the concentration of the free metal and free ligand.

TABLE 2

| Chelant | Log K Ca | Log K Mg | Log K Fe3+ |
|---|---|---|---|
| EDTA | 10.7 | 8.7 | 25.1 |
| HEIDA | 4.7 | 3.4 | 11.6 |

The above Log K values show the dramatically greater chelation strength of EDTA as compared to HEIDA. One would expect that the chelating agent with the greatest metal ion affinity (in this case, EDTA) would have the better performance for removing the soil containing Ca, Mg, and Fe3+. Unexpectedly, in the ASTM tile cleaning test, $K_2HEIDA$ demonstrates equal performance to the much stronger chelating agent, $K_4EDTA$. $K_2HEIDA$ has the advantage of being readily biodegradable in standard laboratory biodegradation tests including, among others, OECD 301A, OECD 301B, OECD 301D, OECD 301E, and the very stringent OECD 306 seawater biodegradation test.

The primary metal present in the standard ASTM soil is calcium. One method of estimating the calcium control performance of a chelating agent is to perform a calcium titration that utilizes the tendency to produce a calcium precipitate when a given amount of chelant can no longer control any additional added calcium, thus producing a visible precipitate. Using such a titration test, one normally deems the best chelants for calcium control as those that accept the most calcium before the precipitate appears per a given unit of chelating agent. A standard titration test often employed to determine a chelant's calcium control effectiveness is the calcium oxalate titration. In this titration, standard calcium chloride titrant is added to a measured amount of chelating agent and the onset of calcium oxalate precipitate (detected as the first permanent turbidity that forms) defines the amount of calcium that can be controlled. Strong chelants accept a mole-for-mole amount of calcium, while weaker chelants will accept less than a mole-for-mole amount of calcium in this titration.

The calcium oxalate titration is performed by weighing about 5 millimoles of the active chelant to a titration vessel, adding water to about 50 ml total volume, adding 10 ml 3% ammonium oxalate solution, adjusting the pH to about 11.6 with potassium hydroxide solution, and titrating the sample mixture with standardized 0.5 M $CaCl_2$ to the first faint permanent turbidity. Results are summarized in Table 3 below:

TABLE 3

| Chelant | % Molar Chelation of calcium (max. = 100) |
|---|---|
| EDTA | 100% |
| HEIDA | 35% |

The calcium oxalate titration data above predicts that $K_4EDTA$ should perform much better than $K_2HEIDA$ for the control of calcium. However, the tile cleaning data from ASTM D5343 unexpectedly show that $K_2HEIDA$ performs equally as well as $K_4EDTA$.

Example 34

Black ceramic tiles (meeting ANSI standard A371.1, 4¼" square) are soiled as directed by the procedure described in *Consumer Specialties Manufacturers Association DCC-16*, (CSMA Detergents Division Test Methods Compendium—Third Edition—May 1995—Pages I-51 to I-55) "Guidelines for Evaluating the Efficacy of Bathroom Cleaners, Part 2: Scrubber Test for Measuring the Removal of Lime Soap.". The principal metals present in the soil mixture used in the tile cleaning test are calcium, followed by magnesium, present as their highly insoluble stearate salts (soap scum). Cleaning solution formulations are prepared as described in the previous example. To the surface of the soiled tiles on the scrubbing apparatus, 1 gram of cleaning solution is sprayed and allowed to stand for 30 seconds. The tile is then scrubbed with a pre-moistened sponge with 454 grams of force for 6 cycles (total of 12 passes over the soiled tile). The tile is then rinsed with water and allowed to air dry. Panelists judge the cleanliness of the tiles on a scale from 0 to 5 (with "0" for completely dirty and "5" for completely cleaned), and the results of the observations are averaged. Results are in Table 4 below:

TABLE 4

| Chelant in formulation | Cleaning rating (higher is better) |
|---|---|
| Blank (no chelant) | 3.13 (+/−0.14) |
| K4EDTA | 3.60 (+/−0.13) |
| $(K)_{2.0}(Na)_{0.0}HEIDA$ | 4.67 (+/−0.26) |
| $(K)_{1.6}(Na)_{0.4}(HEIDA)$ | 4.59 (+/−0.38) |

As shown by the data in Tables 2 and 3, it is unexpected that a weaker chelant such as $(K)_x(Na)_y(HEIDA)^{-2}$ would be able to perform as well as a strong chelant such as $K_4EDTA$. However, the results in Table 4 unexpectedly show that claimed compositions of $(K)_x(Na)_y(HEIDA)^{-2}$ are actually superior to $K_4EDTA$.

While the invention has been described with a limited number of embodiments, these specific embodiments are not intended to limit the scope of the invention as otherwise described and claimed herein. Variations and modifications therefrom exist For example, various additives, not enumerated herein, may also be used to further enhance one or more properties of the compositions described herein. In other embodiments, the compositions do not include, or are essentially free of, any components not enumerated herein. As used herein the term "essentially free of" means that such components are not present in more than trace amounts or are not purposely added to the composition. Also, compositions that consist of or consist essentially of the described components should be considered as disclosed herein. Typically, while the processes are described as comprising one or more steps, it should be understood that these steps may be practiced in any order or sequence unless otherwise indicated. These steps may be combined or separated.

It should also be noted that compounds and compositions described herein are in some cases described as ionic salts for convenience only. Such compounds and compositions need not actually contain the component ions in their ionic form in the claimed compositions and processes. And the recited component ions need not be most accurately described as associated with each other. Rather, the ions of the components may also or alternatively be present or described as being associated with other species in the compositions. Compositions and processes wherein the concentrations of the individual ions are present and could be described or written in the manner used herein should be considered to be within the literal scope of the claimed invention.

Finally, the claimed compositions are not limited to the processes described herein. They can be prepared by any suitable process. The appended claims intend to cover all such variations and modifications as falling within the scope of the invention.

What is claimed is:

1. A chelating composition suitable for low-temperature use or storage, comprising:
   a) 20 to 70 wt. percent of water; and
   b) 30 to 80 wt. percent of a first component, of the formula:

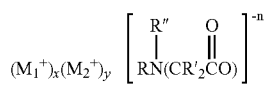

wherein R is a hydroxyalkyl group having from 1 to about 10 carbon atoms;

each R' is individually selected from the group consisting of hydrogen, unsubstituted or inertly substituted alkyl groups; carbonyl-containing alkyl groups, carboxylate-containing alkyl groups, hydroxyalkyl groups and alkoxy groups;

R" has from 1 to about 10 carbon atoms and is selected from the group consisting of unsubstituted or inertly substituted alkyl groups; carbonyl-substituted alkyl groups, carboxylate-containing alkyl groups, hydroxyalkyl groups and alkoxy groups; or hydrogen;

$M_1$ and $M_2$ are individually selected from the group consisting of Na+ and K+, wherein $M_1$ has a greater atomic weight than $M_2$;

wherein x+y=n and the mole fraction of $M_1$ is greater than 0.70 up to 1; and wherein the weight percentages are based on the amounts of the first component and the polar solvent.

2. The composition of claim 1, wherein less than about 5 weight percent of the composition forms solids after being maintained at −12° C. for at 12 hours.

3. The composition of claim 1, wherein the first component follows the formula $(K^+)_x(Na^+)_y(HOCH_2CH_2N(CH_2COO)_2)^{-2}$; wherein x+y=2.

4. The composition of claim 3 further comprising a compound of the formula $(M_1^+)_x(M_2^+)_y(HOCH_2CH_2N(R)(CH_2COO))^{-1}$ where (R) is hydrogen and wherein the mole fraction of $M_1$ ranges from greater than 0.80 to 1, and wherein x+y=1.

5. The composition of claim 1, comprising about 40 to about 70 wt. percent of the first component.

6. The composition of claim 1, wherein the mole fraction of $M_1$ ranges from about 0.80 to about 0.95.

7. A method of suppressing crystallization in a chelating solution, comprising mixing the composition of claim 1 with the chelating solution.

8. The method of claim 7, wherein the first component follows the formula $(K^+)_x(Na^+)_y(HOCH_2CH_2N(CH_2COO)_2)^{-2}$; wherein x+y=2.

9. The method of claim 7 comprising about 40 to about 70 wt. percent of the first component.

10. The method of claim 7, comprising about 50 to about 60 wt. percent of the first component.

\* \* \* \* \*